Dec. 1, 1959  W. F. NEWBOLD  2,915,628
ELECTRICAL CONTROL APPARATUS
Filed July 3, 1953  3 Sheets-Sheet 1

INVENTOR.
WILLIAM F. NEWBOLD
BY
*Arthur H. Swanson*
ATTORNEY.

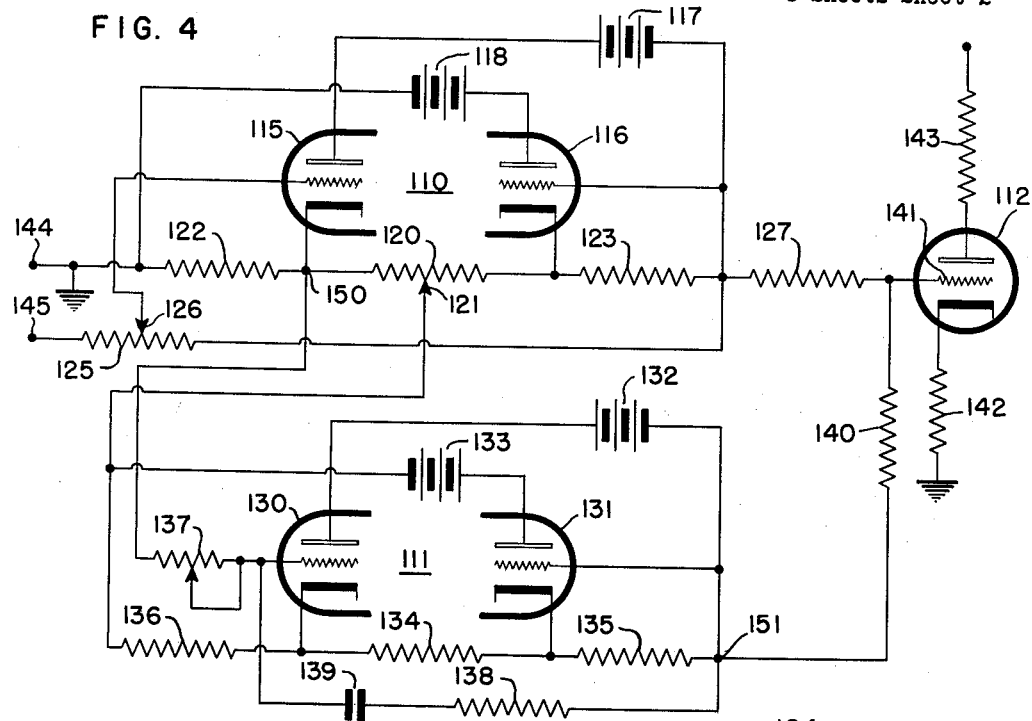

Dec. 1, 1959  W. F. NEWBOLD  2,915,628
ELECTRICAL CONTROL APPARATUS
Filed July 3, 1953  3 Sheets-Sheet 3

*INVENTOR.*
WILLIAM F. NEWBOLD
BY *Arthur H. Swanson*
ATTORNEY.

United States Patent Office 2,915,628
Patented Dec. 1, 1959

2,915,628

ELECTRICAL CONTROL APPARATUS

William F. Newbold, Philadelphia, Pa., assignor to Minneapolis-Honeywell Regulator Company, Minneapolis, Minn., a corporation of Delaware Application July 3, 1953, Serial No. 366,037

10 Claims. (Cl. 250—27)

The general object of the present invention is to provide a new and improved electrical controller which produces an output control signal which is determined by the character of the input signal. More specifically, the present invention is concerned with a new and improved electrical controller which is characterized by its ability to produce proportional amplification as well as produce so-called integrating or reset response and rate response with accompanying stability and reliability.

Electrical signal controllers, when used to accurately control the magnitude of some variable, are often subject to circuit drifting due to changes in the internal parameters of the amplifier of the controller which will throw the control operation off in some unpredictable manner. The elimination of the drifting problem in the amplifier portion of the controller permits much wider application of electrical controllers. In a copending application of Robert J. Ehret, entitled Control Apparatus, filed on even date herewith, and bearing Serial No. 365,982, now Patent No. 2,844,717, there is shown a balanced amplifier whose characteristics are particularly adapted for use in electrical signal controllers.

Electrically operated controllers which embody the features of the present invention may take widely different forms and are adapted for use for many purposes. In general, they may be used wherever it is desired to produce a controlling effect which varies in response to a change in some variable such as, for example, temperature, pressure, flow, liquid level, etc., which tends to vary as a result of the control effect produced by the controller.

In accordance with the present invention, the electrical controller takes the form of a highly balanced and stable amplifier to produce a controlling effect which will be capable of accurately maintaining a controlled variable at a desired value. Such a control must prevent variations in the magnitude of the variable being controlled, which variations may be due to changes in the effect of the controlling medium to changes in the characteristics or amount of the quantity being controlled. On a change in an operating condition, such, for example, as a change in a B.t.u. content of the fuel supply to a furnace, or to a change in the furnace load, the furnace temperature will tend to vary or droop from the desired value. The drooping of the temperature from its desired value may be objectionable in many instances where accurate control is required. Furthermore, if a sufficiently large corrective adjustment is made to restore the furnace temperature to the desired value within a relatively short time and this adjustment is maintained until that value is reached, the furnace temperature may tend to overshoot that value due to the inertia thereof and subsequent corrective adjustments may be required and result in hunting or oscillation of the furnace temperature about the desired value.

The incorporation of the present controller in an automatic control enhances the ability of the control to eliminate tendencies of the controlled variable to hunt or oscillate and the control will maintain the magnitude of the variable at the desired value.

It is accordingly a more specific object of the present invention to provide a new and improved electrical controller which is adapted to accurately maintain the magnitude of a controlled variable at a desired value.

A further object of the present invention is to provide a new and improved electrical controller employing a balanced amplifier which will produce an output controlling effect which is proportional to a deviation of a variable from a desired value and produce a controlling effect which varies as a function of the time duration of a control signal.

A still further object of the present invention is to provide a new and improved electrical signal controller which incorporates a balanced electrical amplifier which produces an output control signal which varies as a function of the time duration of the control signal and by an amount proportional to the magnitude of the control signal.

Another object of the present invention is to provide a new and improved electrical controller which incorporates a pair of balanced amplifiers, one of which is arranged to produce proportional controlling action and the second of which is arranged to produce a controlling action which varies as a function of time and where both of the controllers are effective to jointly control the operation of a control device.

Still another object of the present invention is to provide an improved electrical controller which includes a pair of amplifying sections which are effective to control the operation of a control device with one of the amplifying sections producing a proportional action and the other control section producing a control action which varies as a function of time.

Still another more specific object of the present invention is the provision of a new and improved electrical controller having a pair of amplifier sections and an output control device with one of the amplifying sections supplying a control signal to the control device and the other amplifying section receiving a control signal from the output of the control device to provide a feedback signal to the input of the first mentioned section which feedback circuit is effective to provide proportional action as well as action which varies as a time and amplitude function of the input signal.

Still another object of the present invention is the provision of a new and improved electrical controller employing an amplifying section which is characterized by the gain of the amplifier section providing a multiplication factor for the time constant of the controller where the controller has both proportional and a time function response.

The various features of novelty which characterize the invention are pointed out with particularity in the claims annexed to and forming a part of this specification. However, for a better understanding of the invention, its advantages, and specific objects attained with its use, reference should be had to the accompanying drawings and descriptive matter in which I have illustrated and described preferred embodiments of the invention.

Figure 1:
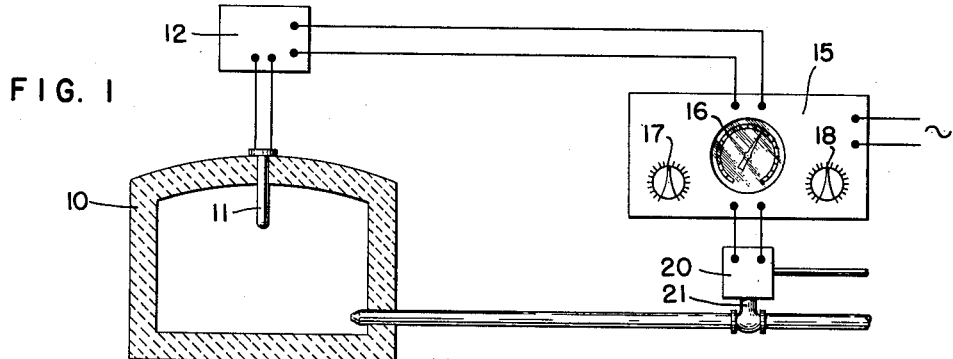
Fig. 1 is a diagrammatic showing of one manner in which the control apparatus of the invention may be used in a specific control.

Of the drawings:

Fig. 4 shows a modified form wherein proportional and integrated action may be obtained using the balanced amplifier of the invention;

Fig. 5 shows a further modified form of the present invention wherein the gain of a portion of the controller is used as a multiplying factor to multiply the time constant in the integration circuit;

*Figure 1*

Referring now to Fig. 1, there is shown a representative control problem which may use the present invention. The numeral 10 represents a furnace whose temperature is to be controlled with the temperature thereof being sensed by a sensing element 11 which may be a thermocouple or some other such device. The output of the sensing element 11 is applied to a suitable signal amplifying device 12. The output of the amplifying device 12 is an electrical direct current signal which will be proportional to the temperature condition in the furnace 10. The output of the amplifier 12 is connected to the input of a suitable controller 15 which forms the basis of the present invention. This controller may be provided with suitable indicating mechanism 16 and adjusting mechanisms 17 and 18, the latter of which may establish the proportional and time functions of the output control signal of the controller 15. The output of the controller may be connected to a suitable electric to pneumatic transducing apparatus 20 which is effective to create an output pressure for controlling a pneumatic valve 21.

The controller in the configuration of Fig. 1 is effective to regulate the flow of a combustible mixture by way of the valve 21 so as to maintain the temperature within the furnace 10 exactly at the value desired and with a minimum of hunting or oscillation of the temperature with respect to the desired value.

Figure 2:
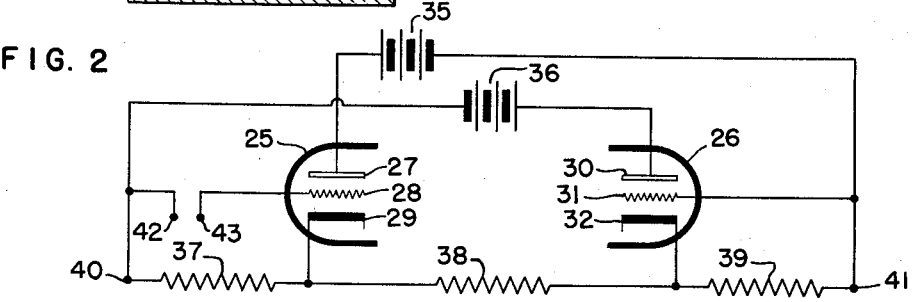
Fig. 2 shows the basic configuration of the balanced amplifier used in the present invention.

*Figure 2*

The apparatus of Fig. 2 shows one form that the balanced amplifier used in the present invention may assume. This amplifier is disclosed and claimed in greater detail in the above mentioned application of Robert J. Ehret. As shown in Fig. 2, the balanced amplifier comprises a pair of electron discharge devices 25 and 26. The device 25 comprises an anode 27, a control electrode 28, and a cathode 29 while the amplifying device 26 comprises an anode 30, a control electrode 31, and a cathode 32. Supplying operating power to the device 25 is a source of power which is represented by a battery 35. The source of power for the device 26 is represented by a battery 36. Three resistors 37, 38, and 39 are used to complete the electrical circuit of the apparatus with the resistor 37 being coupled between the control electrode 28 and cathode 29 of device 25, the resistor 38 being connected between the cathodes 29 and 32, and the resistor 39 coupled between the control electrode 31 and the cathode 32 of device 26.

The amplifier of Fig. 2 is in the form shown because of the tendencies of the various tube parameters to change with time and cause, in the normal amplifier, drifting or changes in the output current, which will upset the desired proportional relation of the output signal with respect to the input control signal. The way it is balanced will be understood upon considering the operation of the amplifier when it is in the form shown in Fig. 2. The current flow circuit for the device 25 is arranged to flow through a circuit that may be traced from the positive terminal of the source 35 to the anode 27, cathode 29, resistor 38, resistor 39, back to the negative terminal of the source 35. The current flow through the device 26 may be traced from the positive terminal of the source 36 through the anode 30, cathode 32, resistor 38, resistor 37, back to the negative terminal of the source 36. It will be noted that the current flows for the devices 25 and 26 flow in the opposite direction through the resistor 38 and that the current flow through the resistor 37 due to the device 26 is in a direction opposite the current flow through the resistor 39 due to the device 25. Thus, between terminals 40 and 41, when the current flows through the devices 25 and 26 are equal, there will be zero net voltage across the resistors 37, 38, and 39. As long as there is no input signal applied into the circuit, the current flows will remain balanced even though the tube parameters of the devices 25 and 26 change in the same manner. These changes are effectively the same in amplifying devices which are of the same age and particularly those devices wherein two amplifying sections are incorporated in a single envelope.

Should an input signal be applied to the input terminals 42 and 43 with a polarity of the signal such as to cause device 25 to conduct more, there will be an increased current flow through the device 25 with a resultant increased current flow through the resistors 38 and 39. The increase in current flow through the resistor 39 will apply an increased biasing action to the input of the device 26 with this biasing action being in a direction to decrease the current flow in the device 26. The decrease in current flow through the device 26 will decrease the current flowing through the resistors 38 and 37 with a resultant regenerative action on the output terminals 40 and 41. It will be obvious that the output potential on the terminals 40 and 41 will be of a polarity which indicates that the device 25 is conducting more and, the terminal 40 will be positive with respect to the terminal 41.

If the input signal polarity applied to terminals 42 and 43 should be reversed so as to decrease the current flow through the device 25, there will be an accompanying decrease in the current flow through the resistors 38 and 39. With the device 25 conducting less, there will be a decrease in the biasing action due to the resistor 39 on the input of the device 26 and this device will conduct more. The greater conduction of the device 26 will cause an increased current flow due to this device through the resistors 38 and 37 which will result in a further biasing action on the input of the device 25 due to the voltage drop across the resistor 37. In this instance, the output signal from the terminals 40 and 41 will be reversed in polarity with the polarity now being positive on terminal 41 and negative on terminal 40. As soon as the input signal on the terminals 42 and 43 has been eliminated, the amplifier will go back to its balanced state of operation with the output signal between terminals 40 and 41 being zero.

Figure 3:
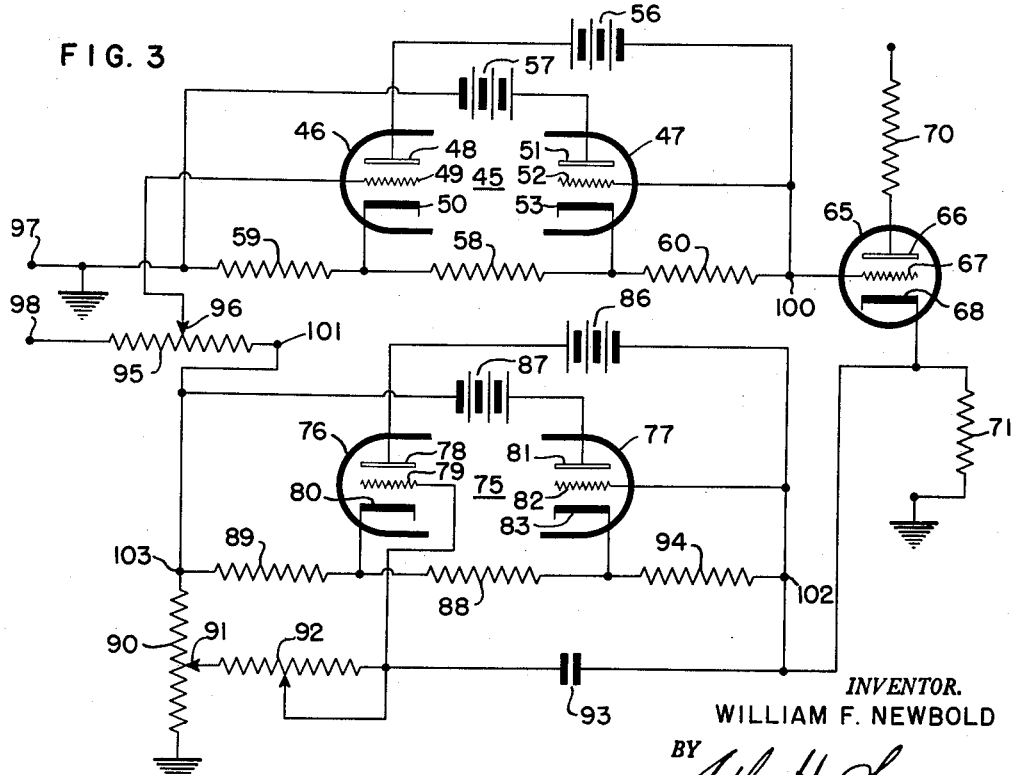
Fig. 3 shows one form of a controller having proportional and integrating or reset control action incorporated therein.

*Figure 3*

The apparatus of Fig. 3 incorporates the basic balanced amplifier shown in Fig. 2 into a controller which has proportional action as well as so-called integrated or reset response. In the present apparatus, the balanced amplifier is first incorporated in a proportional amplifier section 45 which comprises a pair of electronic amplifying devices 46 and 47. The device 46 has an anode 48, a control electrode 49, and a cathode 50 while the device 47 has an anode 51, a control electrode 52, and a cathode 53. Supplying power to the device 46 is a source of power 56 while supplying to the amplifying device 47 is a source of power 57. A resistor 58 is connected between the cathodes 50 and 53, while a resistor 59 is connected to the input of the device 46 and a resistor 60 is connected connected to the input of the device 47.

An output control device is provided for the apparatus and this includes an amplifier device 65 having an anode 66, a control electrode 67, and a cathode 68. A plate resistor 70 is connected to the anode 66 and a cathode resistor 71 is connected to the cathode 68. Either the resistor 70 or the resistor 71 may form the output of the control device 65 with the resistor 70 or 71 representing the input impedance of some signal utilization circuit, such as a galvanometer or the like.

The apparatus also includes an integrating or reset section 75 and this section comprises a pair of amplifying devices 76 and 77 with the device 76 having an anode 78, a control electrode 79, and a cathode 80 and the device 77 having an anode 81, a control electrode 82, and a cathode 83. A source of power 86 supplies power to the device 76 while a source of power 87 supplies power to the device 77. A resistor 88 is connected between the cathodes 80 and 82 while the resistor 89 is connected to the input of the device 76 by way of a slidewire resistor 90, a tap 91, and a rheostat 92. A condenser 93 is connected between the cathode 68 of the device 65 and a control electrode 79 of the device 76. A further resistor 94 is connected to the input of the device 77 between the control electrode 82 and cathode 83.

The control apparatus of Fig. 3 additionally includes a proportional band adjustment in the form of a slidewire resistor 95 having an adjustable slider 96 cooperating therewith with the slider being arranged for direct connection to the control electrode 49 of the device 46. The apparatus also includes a pair of input terminals 97 and 98.

In considering the operation of Fig. 3, it will first be considered that there is no input signal applied to the input terminals 97 and 98. It will further be assumed that the slider 96 on the slidewire resistor 95 does not have any potential applied thereto so that the slider 96 is effectively connected to the terminal 97. Under these circumstances, the amplifying devices 46 and 47 will be conducting an equal amount so that the current flow through the devices will cancel out in the output of the apparatus which is taken between the ground terminal 97 and terminal 100, the latter of which is connected to the control electrode of the amplifying device 65. The reason for this balance condition is the same as the reason set forth in Fig. 2. Under a balanced state of operation, the voltage appearing at terminal 101 on the right end of the slidewire resistor 95 will also be zero. This voltage will be zero when the voltage drop across the resistor 71 in the cathode circuit of the device 65 is equal in magnitude to the voltage across the output of the integrator section 75 as it appears on terminals 102 and 103. In other words, the voltage drop across the resistor 71 when added to that across the terminals 102 and 103 will be zero so that the voltage on the right end of resistor 95 at 101 will be zero. The reason that the voltage between the terminals 102 and 103 will be the same as the voltage across the resistor 71 will be understood when it is noted that a series circuit may be traced from the upper end of the resistor 71 through condenser 93, rheostat 92, and the lower section of slidewire resistor 90 to ground. If the voltage between the terminals 102 and 103 is not equal to the voltage across the resistor 71, there will be a current flowing in that last traced circuit with the current flow indicating a difference in the magnitudes of the voltages. When there is this current flowing, there will be applied to the input of the device 76 a signal indicative of the deviation between the voltages. The conduction of the amplifying device 76 will accordingly be such that there will be an output voltage between the terminals 102 and 103 which will be of sufficient magnitude to tend to hold the voltage equal to the voltage on the resistor 71 to prevent any change in the current flow condition through the condenser 93.

From the foregoing it may be seen that the control circuit of Fig. 3 is basically a closed loop circuit with the device 65 being in the control loop and with the integrating or reset device 75 providing a loop closing function. The need for the condenser 93 in this portion of the apparatus will be understood from the discussion that follows.

It is now assumed that there is a step input signal applied to the input terminals 97 and 98 with the terminal 98 assumed to be positive with respect to the terminal 97. The positive signal on terminal 98 will be applied to the control electrode 49 of the device 46 by way of the slidewire resistor 95 and slider 96. This will cause the device 46 to conduct a greater amount which greater amount will produce a larger biasing action on the device 47 by reason of the current flow through the resistor 60. This will tend to cut down the current flow in the device 47 with the result that the net voltage across the resistors 59, 58, and 60, is negative on the right hand side with respect to ground, or negative on the terminal 100 with respect to ground. In other words, the control electrode 67 of the output control device 65 is negative with respect to its cathode which is connected to ground by way of the cathode resistor 71. The decrease in the current flow through the device 65 due to the negative biasing action from the proportional amplifying section 45 will be accompanied by a decrease in the current flow through the cathode resistor 71. Thus, the voltage across the resistor 71 will be less positive than when the current was of a larger magnitude.

The input voltage to the reset section 75 will be the voltage appearing across the slidewire resistor 90 as picked off by tap 91. The voltage on the slidewire resistor 90 will be the voltage existing at the right end terminal 101 of the proportional band potentiometer. As explained above, this is the algebraic sum of the output voltage on the resistor 71 and the output voltage of the reset section 75. The output voltage of this section will tend to counter-balance the voltage originating from the resistor 71. If the voltage on the output of the reset section exactly balances the voltage on the resistor 71, there will be no net input signal to the reset section and this section will remain in the balanced state as explained above. However, as there has been assumed to be a continuous input error signal, in order for the voltage at the terminal 101 to continue to oppose the voltage on the terminal 98, it is necessary that the output of the reset section continually change in order to supply this balancing voltage. This is due to the action of the reset condenser 93 which slowly charges and tends to dissipate the output signals from the reset section unless the input signal is continually changing.

It should be noted that with a step input signal, as assumed above, there will be an immediate feedback to the terminal 101 from the resistor 71 by way of the reset section 75. The net signal on the input of the proportional band section will then be dependent upon the setting of the slider 96 on the proportional band slidewire resistor 95. This will result in an immediate step change in the output current of the control device 65.

The net effect of the step input signal is that the output current in the device 65 will change immediately to a new value and this change will be proportional to the input signal and will be dependent in magnitude upon the position of the slider 96 upon the proportional band slidewire resistor 95. As long as the input step signal is present, the output current of the device 65 will continually change so as to produce an integrated output which is dependent upon the magnitude of the error and the time length that this error is present.

If the input signal polarity should be reversed, the operation of this control will likewise reverse. Thus, a step signal of opposite polarity will cause an immediate current change in the output device 65 and if the step input continues, the reset section 75 will introduce an integrated function into the output of the device 62.

The need for the integrated signal in addition to the proportional action will be understood upon reference to Fig. 1 when it is noted that the furnace temperature is being controlled by the controller 15. This controller is to maintain the temperature in the furnace 10 exactly at the desired value. If there is a deviation or input error signal to the controller 15, it is desired that the controller make a continuous adjustment until such time as that error signal is removed. Thus, referring again to Fig. 3, if the control device 65 can increase its output current slowly when there is a continuous error signal between the terminals 97 and 98, it is possible for the controlling action of the control device 65 to slowly increase its effect in increasing the temperature within the furnace 10 by causing wider opening of the valve 21 or such other regulation as is necessary to bring the temperature to the desired value.

As soon as the input error signal has been reduced to zero, the reset section 75 will tend to maintain the controller output current operating at a steady level which will maintain the current conducted by the device 65 constant. The magnitude of the reset output signal is dependent upon the setting of the slider 91 on the associated slidewire resistor 90. Thus, if the slider 91 is positioned near the upper end of the slidewire 90, the error signal on the input of the section 75 will be greater and the rate of change of the output signal will be greater. If the slider is moved to the lower end of the slidewire 90, the reset output rate will be lower. Further, the reset rate may also be adjusted by varying the amount of resistance of the rheostat 92 which is in the series circuit which includes the integrating or reset condenser 93. As will be obvious, the reset rate is dependent upon the particular process under control with some processes being capable of having a relatively fast resetting action and other processes requiring very slow resetting action.

In addition, the proportional band action of the present apparatus may be varied by the moving of the slider 96 over the slidewire 95. With the slider 96 positioned in the left end of the slidewire resistor 95, there will be a minimum of feedback action from the control device 65 to the input so that there will be a very high gain and a resultant large increase in output current to the device 65 on a relatively small input signal on the input terminals 97 and 98. If the slider 96 should be moved to the opposite end of the slidewire resistor 95, the overall gain of the proportional section 45 would be relatively low because the full effect of the feedback action from the output control device 65 would be felt on the input of the proportional band amplifier section. The proportional band setting, like the reset rate setting, will be dependent upon the particular process under control. It will be obvious, however, that the present apparatus is flexible and adapted for use in nearly all types of process controls.

*Figure 4*

The apparatus of Fig. 4 comprises a proportional band amplifying section 110 and a reset or integrating section 111. The apparatus of Fig. 4 also includes an output control device 112. In the arrangement of Fig. 4, the proportional band amplifying section and the integrating or reset section are operating in parallel to supply a signal to the output control device 112. The output signal will be a proportional signal and a signal which varies in accordance with the time duration and magnitude of the error signal present on the input of the controller.

More specifically, the proportional band amplifying section 110 comprises a pair of amplifying devices 115 and 116 with the device 115 receiving power from a suitable direct current source 117 and the device 116 receiving power from a suitable source 118. A slidewire resistor 120 is connected between the cathodes of the devices 115 and 116 and this slidewire resistor has a tap or slider 121 cooperating therewith. A resistor 122 is connected to the input of the device 115 and a resistor 123 is connected to the input of the device 116. A proportional band adjustment for the apparatus is provided by a slidewire resistor 125 and a cooperating slider 126. An output summing resistor 127 is connected between the output of the proportional band amplifying section 110 and the input of the control device 112.

The integrating or reset section comprises a pair of amplifying devices 130 and 131. The device 130 receives its energization from a source 132 while the device 131 receives its energy from a power source 133. A resistor 134 is connected between the cathodes of the devices 130 and 131, while a resistor 135 is connected to the input of device 131 and a resistor 136 is connected in the input circuit of the device 130 along with an adjustable rheostat 137. Connected across the output of the integrating section 111 is a resistor 138 which is connected in series with a condenser 139. The output of the integrating section 111 is coupled through a summing resistor 140 to the input of the control device 112. The control device 112 has as its input a control electrode 141 and has a cathode resistor 142 and an anode resistor 143.

In considering the operation of the electrical controller shown in Fig. 4, the proportional band amplifying section 110 and the integrating and reset section 111 may be considered separately. Considering first the proportional band amplifying section 110, it will first be assumed that there is no input error signal applied to input terminals 144 and 145. Under these circumstances, the terminal 145 will be effectively connected to the terminal 144 insofar as the controller is concerned. With no input signal applied to the input terminals, there will be no input signal applied to the input of the amplifying device 115 and therefore the conduction of the device 115 and that of the device 116 will be the same so that the net voltage appearing across the resistors 122, 120 and 123 will be zero. This will mean that between the ground input terminal 144 and an output terminal 146 there will be no voltage appearing and therefore no voltage appearing across the summing resistor 127 on the input of the control device 112.

If a signal is applied to the input terminals 144 and 145, the signal will be applied to the input of the amplifying device 115 by way of the slidewire resistor 125 and its associated slider 126. This will change the current flow in the device 115 with a resultant change in the biasing action on the input of the device 116, in the manner explained in connection with Fig. 2. This will result in an output signal appearing across the resistors 122, 120, and 123 and there will be a signal applied to the input of the control device 112. The proportional relationship between the output voltage appearing on terminal 146 with respect to the voltage appearing on terminal 145 will be dependent upon the setting of the slider 126 on its associated slidewire resistor 125. If the slider 126 is moved to the left end of the slidewire resistor 125, the gain of the proportional amplifying section 110 will be relatively large while if the slider 126 is moved to the right end of the slidewire resistor 125, there will be a larger feedback from the output terminal 146 and a resultant decrease in the overall gain of the amplifying section 110. The immediate effect of the control signal appearing on the output terminal 146 will be to cause the current flow through the control device 112 to follow the voltage on terminal 145.

The action of the integrating section 111 will be understood if it is first assumed that there is no input signal applied to the integrating section. There will be no input applied to the integrating section when the voltage across the slidewire resistor 120 is equal to zero indicating a balance condition in the proportional band amplifying section 110. The input to the integrator section is taken at terminal 150 between the resistors 122 and 120 and at the tap 121 on the slidewire resistor 120. With no signal appearing between the tap 121 and terminal 150, the control electrode of the device 130 will be effectively connected at the left end of resistor 136 so that the circuit will take the basic form shown in Fig. 2. With no input signal applied to the device 130, the devices 130 and 131 will be conducting an equal amount and there will be no output voltage appearing across the resistors 136, 134, and 135. This will mean that the only voltage appearing on the input of the control device 112 will be due to the voltage across resistor 122 since the input circuit through the integrator section may be traced from the control electrode 141 to 140, resistor 135, resistor 134, resistor 136, slider 121, slidewire resistor 120, and resistor 122 to ground. The voltage on the resistor 122 will be effectively constant when there is no input signal applied to the terminals 144 and 145 so that a fixed current flow will be established through the control device 112.

Should there be an unbalance signal on input terminals 144 and 145 so that there is a signal appearing between the slider 121 and terminal 150, this signal will be applied to the input of the amplifying device 130 by a circuit that may be traced from the terminal 150 through resistor 137 to the input control electrode of device 130 and to the cathode of the device 130 through resistor 136 back to tap 121 slidewire 120. This input voltage will cause an unbalance in the amplifier devices 130 and 131 with the resultant output voltage which, initially, will tend to be completely balanced out because of the feedback circuit across the output of the integrating section 111. This feedback includes the resistor 138 connected in series with the condenser 139 and is in the nature of negative feedback which balances the input signal. Due to the presence of the condenser 139 in this feedback circuit, the negative feedback action will tend to decrease as the condenser 139 charges so that the only way for the section to maintain a balance is for there to be a larger output voltage across the output of the section. As this amplifier section has high gain, the output signal appearing on terminal 151 will slowly change as the condenser 139 charges with the change being dependent upon the magnitude and time duration of the error signal present across the tapped portion of the slidewire resistor 120. This slowly changing voltage which is appearing at terminal 151 will be applied through the summing resistor to the input of the device 112 so that now the control device output will be slowly changing to follow the potential on the terminal 151.

In order to change the integrating rate of the integrating section 111, it is but necessary to move the slider 121 over the associated slidewire resistor 120 to vary the magnitude of the error signal appearing on the input of the section. If a larger change is required at the terminal 151, the slider 121 should be moved to the right hand terminal of the slidewire resistor 120. On the other hand, if no integrating action is required, the slider 121 may be moved to the left end of the slidewire resistor 120 so as to eliminate any integrating action from the section 111. Any offset of the reset section 111 may become appreciable if the slider 121 is moved to the extreme left and so operation at this point is not always desirable. In addition, the integrating action of the section 111 may be varied by changing the time constants of the circuits associated with the charging of condenser 139.

Figure 5

The apparatus of Fig. 5 comprises a proportional band amplifying section 160 and an integrating or reset section 161. Both of these sections are built up around the basic balanced amplifier of the type shown in Fig. 2. Section 160 comprises a pair of amplifying devices 162 and 163 with the device 162 being supplied by a source of power 164 and the device 163 being supplied by a source of power 165. A resistor 166 is connected between the cathodes of the devices 162 and 163 while the resistor 167 is connected to the input of the device 162 and a resistor 168 is connected to the input of the device 163. The input to the apparatus of Fig. 5 is at terminals 170 and 171 with a connection to the input of the device 162 being by way of a proportional band slidewire resistor 172 and an associated slider 173. The output of the proportional band amplifying section 160 is at terminal 175 which is directly connected to an input control electrode 176 of an output control device 177. The output control device is shown as a triode having connected to the anode thereof a resistor 178 and to the cathode thereof a resistor 179.

The integrating section 161 comprises a pair of amplifying devices 180 and 181. The device 180 is supplied by a suitable power source 182 while the device 181 is supplied by a suitable power source 183. Connected between the cathodes of the amplifying devices 180 and 181 is a resistor 184. Connected to the input of the device 181 is a resistor 185 and connected to the input of the device 180 is a further resistor 186. A further pair of resistors 187 and 188 are connected in series across the resistors 185, 184, and 186. A condenser 190 is connected between the upper terminal of the cathode resistor 179 by way of a rheostat 193 to the junction between the resistors 187 and 188.

The operation of the apparatus of Fig. 5 is best understood by considering the operation when a step input signal is applied to the input terminals 170 and 171. It is assumed that the step input signal is positive on terminal 171 with respect to terminal 170 and that this positive signal will be applied to the input control electrode of the amplifying device 162 by way of the proportional band slidewire resistor 172 and slider 173. The positive signal applied to the control electrode of the device 162 will cause this device to conduct more and the device 163 to conduct less so that the net output voltage appearing upon the terminal 175 will be more negative with respect to the ground input terminal 170. This more negative signal will cause a decrease in the current flow to the device 177 and a resultant decrease in the voltage across the cathode resistor 179. Since there is an immediate change in the voltage across the resistor 179, this is in the form of a pulse which will be applied through the condenser 190 directly to the input control electrode of the amplifying device 180 of the integrating section 161. The decrease in voltage on the input of the device 180 will cause the current flow through the device 180 to decrease and there will be a corresponding increase in the current flow through the device 181. This will result in there appearing between terminals 191 and 192 on the output of the integrating section 161 a voltage signal which is negative on terminal 192 with respect to terminal 191. This negative signal is applied to the right end of a proportional band slidewire resistor 172. The negative voltage appearing on the right end of the slidewire resistor 172 will tend to balance the positive voltage applied to the right end of the proportional band resistor 172. In other words, the feedback from the terminal 192 is a negative feedback tending to balance the positive input voltage applied to the input terminals.

If the input step signal on the terminals 170 and 171 persists for any length of time, the condenser 190 will tend to slowly assume a charge and as it assumes a charge there will be a change in the output voltage on the device 180 with a resultant change in the output current from the integrating section 161 as it appears on terminals 191 and 192. This change will, when acting through the amplifying section 160, cause the output current of the device 177 to slowly change in a direction which will cause the controlling action of the control device 177 to correct the condition causing the continued input error on the input terminals 170 and 171.

As soon as the input signal on the terminals 170 and 171 has been eliminated, the current flow through the device 177 will tend to maintain or hold the current flow which has been established by the charging of the condenser 190 on the input of the amplifier section 161. The voltage drop across the resistor 179 must be equal to the voltage drop across the resistor 188, the latter of which is in the voltage divider across the output of the integrating section between terminals 191 and 192. If the voltage drops are not the same, there will be a tendency for current to flow in the circuit which includes the condenser 190 and the rheostat 193. Such a current flow through the resistor 193 will establish a biasing voltage on the input of the device 180 which will cause current flow in the output of the integrating section 161 to be in a direction to eliminate the voltage deviation so as to tend to hold the current flow in the device 177 constant.

Inasmuch as the right end of the resistor 193 is connected to the junction between the resistors 187 and 188, this couples the input to the amplifying section 161 into the output so that the gain of the amplifying section becomes a function of the input impedance to the section. The net effect of this is that the magnitude of the resistance of resistor 193 is multiplied by a factor which includes the gain of the amplifier section 161. In order to maintain the voltage on the condenser 190, it is necessary that the resistance in series therewith be relatively high and this requires that the resistor 193 appear as a high resistance. In one form of the electrical controller it was found that a resistance of approximately 300 megohms is required for the circuit to work properly. Although such high resistances are available, they are not stable and are subject to changes due to ambient conditions and therefore it is very desirable to provide some time constant multiplier. This is effected in the present controller by connecting the input resistor 193 to the junction of the resistors 187 and 188 so that the gain of the section 161 will act as the multiplier and the magnitude of resistor 193 will appear to be very large. This multiplying factor of the amplifier is also dependent upon the ratio of the magnitude of resistor 188 to resistor 187.

Figure 6:
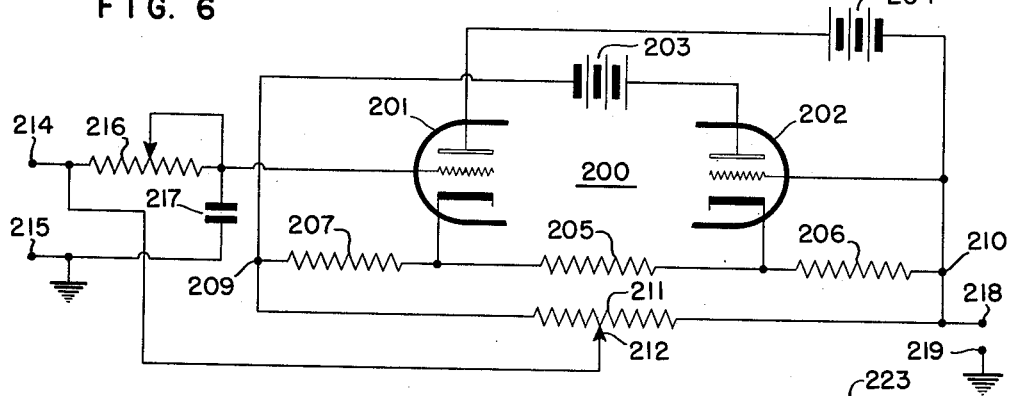
Fig. 6 shows the balanced amplifier of the present control adapted for proportional and rate operation.

*Figure 6*

The apparatus of Fig. 6 shows one form that a rate circuit incorporating the balanced amplifier in Fig. 2 may take. In this figure there is a basic balanced amplifier section 200 which includes a pair of amplifying devices 201 and 202. A source of power 203 supplies power to the device 202 and a source of power 204 supplies power to the device 201. A resistor 205 is connected between the cathodes of the devices 201 and 202 while the resistor 206 is connected to the input of the device 202 and a resistor 207 is connected to the input of the device 201. Connected across the output of the amplifying section at terminals 209 and 210 is a slider resistor 211 and an associated slidewire 212. The input circuit to the apparatus is on terminals 214 and 215, which terminals have connected in series therewith an adjustable rheostat 216 and a condenser 217. The output terminals for the apparatus are terminals 218 and 219.

Considering the operation of Fig. 6, it is first assumed that there is no input signal applied to the terminals 214 and 215. With no input signal to the terminals 214 and 215 the current flow through the resistors 206, 205, and 207 should be such that there is no output voltage between the terminals 209 and 210. This will means that there will be no output voltage between the output terminals 218 and 219.

It is assumed next that a step input signal is applied between the terminals 214 and 215 with the terminal 214 being positive with respect to the terminal 215. At the first instant that the step signal is applied, there is a voltage produced across the resistor 216 which is positive on the left end terminal and zero on the right end terminal. The positive signal on the left end terminal will cause the current flow in the device 201 to decrease, which decrease will result in an increase in the current flow in the device 202. The result will be a voltage between the terminals 209 and 210 which is positive on terminal 210 and negative on terminal 209. The positive signal on terminal 210 is applied to the right end of the slidewire resistor 211 to provide a positive signal which will tend to reinforce or provide a regenerative effect on the input of the device 201. The amount of this regenerative effect will be dependent upon the position of the slider 212 on the slidewire resistor 211. In other words, the slider 212 is a rate amplitude adjustment for the apparatus. This regenerative action will cause a relatively high amplitude pulse to be generated on the output of the apparatus at terminals 218 and 219 which pulse will be in accordance with the rate of change of the input signal on terminals 214 and 215. Generally speaking, the apparatus of Fig. 6 is used in combination with some other controller wherein both proportional and rate action may be obtained. The apparatus of Fig. 6 may be operated in parallel with the apparatus of Fig. 4, for exmple, with the output being connected to a suitable summing resistor to the input of the current controlling device 112. In the arrangement of Fig. 6, the proportional band is fixed.

Figure 7:
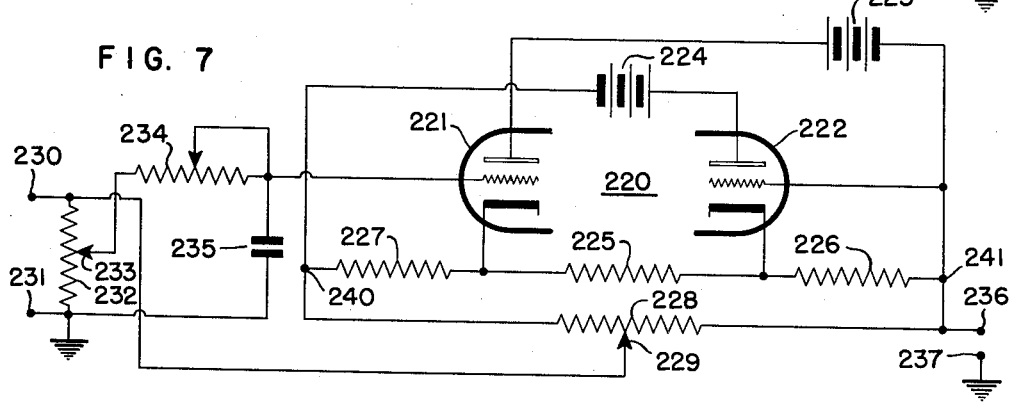
Fig. 7 shows a modified form of the apparatus of Fig. 6 with proportional adjustment provided.

*Figure 7*

The apparatus of Fig. 7 is basically the same as that of Fig. 6 with the exception that the appaartus includes both an adjustable proportional band and rate response.

The apparatus of Fig. 7 comprises a basic amplifier section 220 which includes a pair of amplifying devices 221 and 222. The device 221 is supplied by a suitable source of power 223 while the amplifying device 222 is supplied by a separate power source 224. Connected between the cathodes of the device 221 and 222 is a resistor 225, while the resistor 226 is connected to the input of the device 222 and a resistor 227 forms a part of the input for the device 221. A slidewire resistor 228 is connected across the end terminals of the resistors 227, 225, and 226 connected in series and this slidewire resistor has a cooperating slider 229. The input to the apparatus is on terminals 230 and 231 with a proportional band adjusting slidewire resistor 232 and a cooperating slider 233 connected across the input terminals. Also associated with the input terminals is an adjustable resistor 234 in the form of a rheostat and a condenser 235. The output terminals for the apparatus are terminals 236 and 237.

The operation of the apparatus of Fig. 7 is basically the same as that of Fig. 6 with the output signal in Fig. 7, with a step input, being in the form of a pulse which will be followed by a signal whose amplitude will be proportional to the amplitude of the step input signal. In the absence of any input to the terminals 230 and 231 there will be no output on the output terminals 236 and 237.

More specifically, when a step input signal is applied to the input terminals 230 and 231, assuming that the terminal 230 is positive with respect to the terminal 231, there will be applied a signal to the input of the device 221. This signal is picked off of the slidewire resistor 232 by the slider 233 and applied to the resistor 234 connected in series with the condenser 235. This will result in a negative potential being applied to the input of the device 221 which will cause the device 221 to conduct less and the device 222 to conduct more, so as to produce between terminals 240 and 241 an output signal such that the terminal 241 will be positive with respect to the terminal 240. A portion of this voltage will be picked off by the slider 229 on the slidewire resistor 228 and fed back to the input to create a certain amount of regeneration in the operation of the apparatus which will be dependent upon the setting of the slider 229 on the resistor 228. After a predetermined time, determined by the setting of the resistor 234, the condenser 235 will be charged and the rate function will no longer be present if the input signal to the terminals 230 and 231 is steady. However, the presence of a voltage across the resistor 232 will result in there being applied to the input of the device 221 a control signal which will cause the output of the amplifier section 220 to be of a magnitude which is proportional to the input signal as determined by the setting of the slider 233 on the slide-wire resistor 232. The output on the terminals 236 and 237 will thus be, with a step input signal, a signal having a sharp wave front of amplified amplitude which will stabilize out at a value lower in magnitude. As with the apparatus in Fig. 6, the rate amplitude may be adjusted by the position of the slider 229 on the associated resistor 228 although this rate amplitude is also determined in part by the setting of the slider 233 on the associated slidewire resistor 232. This apparatus may also be used in combination with the apparatus shown in the other figures.

Figure 8:
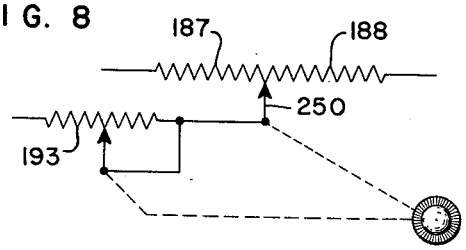
Fig. 8 shows a modification of the circuit of Fig. 5.

*Figure 8*

The apparatus of Fig. 8 shows a modification of the apparatus of Fig. 5 wherein there is an increased range of reset rate adjustment provided with a single manual adjustment. Here the resistors 187 and 188 are joined to form a single resistor with an adjustable tap 250. This tap is effective to change the ratio of 188 to 187 and thereby the multiplication factor of the associated amplifier. By connecting the slider 250 to move with the slider of the rheostat 193, it is possible to extend the range of reset rate adjustment. The adjustment range may be on the order of 1 to 100,000, or for example, .001 to 100 repeats per minute.

From the foregoing it will be seen that there has been provided an electrical control apparatus built up around a balanced amplifier with the control apparatus adapted for proportional action, rate action, and reset or integrated action. It will be further seen that these various actions may be combined in any desired manner depending upon the particular control problem wherein the apparatus is to be used.

While, in accordance with the provisions of the statutes, there has been illustrated and described the best forms of the embodiments of the invention known, it will be apparent to those skilled in the art that changes may be made in the form of the apparatus without departing from the spirit of the invention as set forth in the appended claims and that in certain cases, certain features of the invention may be used to advantage without a corresponding use of other features.

Having now described the invention, what I desire to secure by Letters Patent is:

1. In an electrical controller, the combination comprising, a first pair of electronic amplifying devices having independent sources of power and having their outputs connected in series opposition, an output electronic device having an input connected to said series connected outputs, a second pair of electronic amplifying devices having independent sources of power having their outputs connected in series opposition and having an input derived from said output device, and means connecting the output of said second pair of electronic devices in opposition to the input of said first pair of electronic devices.

2. In an electrical circuit, the combination comprising, a pair of electronic amplifying devices each having input circuits and independent sources of power and having their outputs connected in series opposition in a single output, a degenerative feedback circuit connected from said single output to the input of one of said amplifying devices to establish a predetermined proportional relation between output signal and input signal applied to said one amplifying device, a condenser connected across said input and said single output, and a resistor connected in a series circuit with said condenser to cooperate with said condenser in introducing a time delay in the proportional action of said feedback circuit.

3. In an electrical circuit, the combination comprising, a pair of electronic amplifying devices each having input circuits and independent sources of power and having their outputs connected in series opposition in a single output, a degenerative feedback circuit connected from said single output to the input of one of said amplifying devices to establish a predetermined proportional relation between output signal and input signal applied to said one amplifying device, a condenser connected across said input and said single output, an adjustable resistor connected in a series circuit with said condenser to cooperate with said condenser in introducing a time delay in the proportional action of said feedback circuit, and a further resistor having an adjustable tap in said feedback circuit and connected to said output circuit.

4. Electrical signal control apparatus comprising, a first signal amplifying section having an input and an output, an adjustable feedback around said first amplifying section for establishing a predetermined proportional relationship between the magnitude of the output with respect to the input, a second signal amplifying section having an input and an output, each of said first and second amplifying sections comprising a pair of independently energized amplifying devices having an input on one of said devices and an output common to both of said devices where the signals from said devices are in opposition, a reactive feedback around said second amplifier section for establishing an output signal which varies with time when a steady input signal is applied thereto, means connecting the input of said second amplifying section to the output of said first amplifying section, said means comprising an adjustable tapped resistor for varying the magnitude of the input signal to said second amplifier section to vary the time rate of change of the output of said second amplifier section, and a control device connected directly to the outputs of both of said amplifier sections.

5. Electrical signal control apparatus comprising, a first direct current signal amplifying section having an input and an output, an adjustable feedback around said first amplifying section for establishing a predetermined proportional relationship between the magnitude of the output with respect to the input, a second direct current signal amplifying section having an input and an output, a reactive feedback around said second amplifier section for establishing an output signal which varies with time when a steady input signal is applied thereto, circuit means connecting the inputs of said first and second amplifying sections to respond to the same input control signal, and further circuit means connecting the outputs of both of said amplifying sections to the input of a control device.

6. Electrical signal amplifying apparatus comprising, a first direct current amplifier section having an output and an input, an amplifying control device having an input and an output, means connecting the input of said control device to the output of said first amplifying section, a second direct current amplifier section having an input and an output, a tapped voltage divider connected across the output of said second amplifying section, a condenser, circuit means including said condenser connecting the output of said control device to the input of said second amplifying section and to the tap of said voltage divider, and a feedback connection from the output of said second amplifying section to the input of said first amplifying section.

7. Electrical signal amplifying apparatus comprising, a first direct current amplifier section having an output and an input, an amplifying control device having an input and an output, means connecting the input of said control device to the output of said first amplifying section, a second direct current amplifier section having an input and an output, a tapped voltage divider connected across the output of said second amplifying section, a condenser, a coupling circuit including said condenser connecting the output of said control device to the input of said second amplifying section, a resistor connected between said condenser and said tapped voltage divider so that said resistor and said condenser will have a time constant in said circuit which is dependent upon the gain of said second amplifying section, and a feedback connection from the output of said second amplifying section to establish proportional control of the output of said control device with a further output component which is a function of the time duration of an input signal to the input of said first amplifying section.

8. Apparatus as defined in claim 7 wherein the tap of said voltage divider and said resistor are simultaneously adjustable.

9. Electrical signal amplifying apparatus comprising, a first direct current amplifier section having an output and an input, an amplifying control device having an input and an output, means connecting the input of said control device to the output of said first amplifying section, a second direct current amplifier section having an input and an output, a tapped voltage divider connected across the output of said second amplifying section, a condenser, a coupling circuit including said condenser connecting the output of said control device to the input of said second amplifying section, and a resistor connected between said condenser and said tapped voltage divider so that said resistor and said condenser will have a time constant in said circuit which is dependent upon the gain of said second amplifying section, and a feedback connection from the output of said second amplifying section to establish proportional control of the output of said control device with a further output component which is a function of the time duration of an input signal to the input of said first amplifying section, said feedback connection comprising a tapped voltage divider with the tap thereof adjustable to establish the proportional control of said apparatus.

10. Apparatus as claimed in claim 9 wherein each of said first and second amplifier sections comprise a pair of separate amplifier devices differentially connected to a common output with the output of each device connected to affect the conductivity of the other.

References Cited in the file of this patent

UNITED STATES PATENTS

| | | |
|---|---|---|
| 2,201,345 | Percival | May 21, 1940 |
| 2,281,238 | Greenwood | Apr. 28, 1942 |
| 2,354,718 | Tuttle | Aug. 1, 1944 |
| 2,426,256 | Zenor | Aug. 26, 1947 |
| 2,480,163 | Romander | Aug. 30, 1949 |
| 2,506,770 | Braden | May 9, 1950 |
| 2,559,662 | Reingold | July 10, 1951 |
| 2,562,792 | James | July 31, 1951 |
| 2,584,882 | Johnson | Feb. 5, 1952 |
| 2,621,292 | White | Dec. 9, 1952 |
| 2,687,474 | Richmond | Aug. 24, 1954 |

FOREIGN PATENTS

| | | |
|---|---|---|
| 675,268 | Great Britain | July 9, 1952 |